(12) United States Patent
Archer (10) Patent No.: US 8,030,862 B2
(45) Date of Patent: Oct. 4, 2011

(54) METHODS AND SYSTEMS FOR OPERATING DIRECT CURRENT MOTORS

(75) Inventor: William A. Archer, Fort Wayne, IN (US)

(73) Assignee: RBC Manufacturing Corporation, Wausau, WI (US)

( * ) Notice: Subject to any disclaimer, the term of this patent is extended or adjusted under 35 U.S.C. 154(b) by 327 days.

(21) Appl. No.: 11/683,674

(22) Filed: Mar. 8, 2007

(65) Prior Publication Data

US 2008/0218917 A1 Sep. 11, 2008

(51) Int. Cl.
*H02P 6/00* (2006.01)

(52) U.S. Cl. .................. 318/400.01; 318/135; 318/280; 318/345; 361/1; 361/23; 361/33

(58) Field of Classification Search ............. 318/400.01, 318/280, 345, 135; 361/33, 1, 23
See application file for complete search history.

(56) References Cited

U.S. PATENT DOCUMENTS

| | | | |
|---|---|---|---|
| 4,015,182 A | 3/1977 | Erdman | |
| 4,412,160 A * | 10/1983 | Kojima et al. ............... | 318/280 |
| 4,459,519 A | 7/1984 | Erdman | |
| 4,636,709 A * | 1/1987 | Ohsawa ...................... | 323/267 |
| 4,697,136 A | 9/1987 | Ishikawa | |
| 5,818,705 A * | 10/1998 | Faulk ............................ | 363/48 |
| 5,977,659 A * | 11/1999 | Takehara et al. ............... | 307/85 |
| 6,118,235 A * | 9/2000 | Redlich ......................... | 318/135 |
| 6,271,638 B1 * | 8/2001 | Erdman et al. ........... | 318/400.01 |
| RE37,576 E | 3/2002 | Stephens et al. | |
| 6,369,535 B1 | 4/2002 | Wang et al. | |
| 6,369,536 B2 | 4/2002 | Beifus et al. | |
| 6,456,023 B1 | 9/2002 | Becerra et al. | |
| 6,469,920 B2 * | 10/2002 | Butler et al. .................... | 363/89 |
| 6,583,523 B1 * | 6/2003 | Bhate .............................. | 307/86 |
| 6,636,107 B2 * | 10/2003 | Pelly ............................ | 327/552 |
| 6,661,684 B2 * | 12/2003 | Morita ............................ | 363/89 |
| 6,949,899 B2 * | 9/2005 | Horng et al. ............... | 318/400.3 |
| 7,143,597 B2 * | 12/2006 | Hyland et al. ................. | 62/236 |
| 7,145,265 B2 * | 12/2006 | Mc Nulty et al. ............... | 307/44 |
| 2006/0087800 A1 | 4/2006 | Savage | |

FOREIGN PATENT DOCUMENTS

JP 5108176 A 4/1993
JP 2000023472 A 1/2000

OTHER PUBLICATIONS

European Search Report 08250651.0-2207/1968185 dated Feb. 18, 2011, 6 pages.

* cited by examiner

*Primary Examiner* — Walter Benson
*Assistant Examiner* — David S Luo
(74) *Attorney, Agent, or Firm* — Armstrong Teasdale LLP (57) ABSTRACT

A method for applying power to an electronically commutated motor (ECM) is described. The method includes connecting an AC voltage source to an input of a rectification circuit, connecting a DC voltage source to an output of the rectification circuit, and electrically connecting the DC voltage source and rectification circuit output to operational components of the ECM. The DC voltage source is capable of providing a voltage equal to or greater than a rectified voltage originating from the AC voltage source, and the DC voltage source is connected in parallel with the output of the rectification circuit.

20 Claims, 7 Drawing Sheets

METHODS AND SYSTEMS FOR OPERATING DIRECT CURRENT MOTORS

BACKGROUND OF THE INVENTION

This invention relates generally to motor operation, and more specifically to methods and systems for operating motors, including one or more of an electronically commutated motor (ECM), which is sometimes referred to as a brushless DC motor, a variable speed induction motor (VSIM), and a switched reluctance motor (SRM).

Using the ECM as an example, such motors operate using a DC voltage. However, due to the availability of AC voltage outlets, ECMs are typically equipped for operation using an AC voltage. More specifically, ECMs are typically fabricated with a rectification circuit therein which rectifies the readily available AC voltage to a DC voltage that can be utilized by the operation components of the ECM (brushless DC motor). VSIMs and SRMs also operate utilizing a DC voltage.

Solar panels, when impinged by light, output a DC voltage. Based on the construction of the solar panel, the voltage is typically in the 12-36 volt range. While some devices are fabricated to utilize such a range of DC voltage, in other applications, an inverter is utilized to transform the DC voltage to the more typical 110 VAC or 230 VAC. This "inversion" to an AC voltage allows solar panels to be utilized to provide power to many conventional devices. However, the component cost of the inverter circuit may take away from the benefit of using solar power to operate electrical equipment, especially when the electrical equipment to be powered has a cost that is less than that of the inverter circuit. With regard to providing power for ECM operation, it has also been considered inefficient to invert the DC voltage from solar panels to an AC voltage (for application to a connector of an ECM) then rectify that AC voltage back to DC (using the internal rectifier circuit) for motor operation.

To provide an amount of power to operate such equipment, the 12-36 volts DC solar panels have been traditionally connected in parallel in order to provide an increased amount of current. However, it is known that connecting solar panels in series will increase the DC voltage output. However, such a configuration has heretofore been considered unconventional, since a relatively small percentage of electrical power consuming devices are configured to utilize high voltage DC as a power source.

BRIEF DESCRIPTION OF THE INVENTION

In one aspect, a method for applying power to a DC motor is provided. The method comprises configuring the motor with at least one protection device, connecting an AC voltage source to an input of a rectification circuit, connecting a DC voltage source to an output of the rectification circuit through the at least one protection device, electrically connecting the DC voltage source and rectification circuit output to operational components of the motor, and electrically connecting the ground of the DC voltage source to a ground associated with the AC voltage source. The DC voltage source is capable of providing a voltage equal to or greater than a rectified voltage originating from the AC voltage source and the combination of the DC voltage source and at least one protection device is connected in parallel with the output of the rectification circuit.

In another aspect, electronically commutated motor (ECM) is provided that comprises a power connector and a rectification circuit. The power connector comprises a plurality of input terminals for connection to an AC voltage source, and a plurality of input terminals for connection to a DC voltage source, where at least one of the AC voltage source input terminals is configured for electrical connection to a ground of the AC voltage source, and at least one of the DC voltage source input terminals is configured for electrical connection to a ground of the DC voltage source. The motor includes at least one protection device in series with at least one of the DC voltage source input terminals. The rectification circuit comprises an input and an output, the rectification circuit input is connected to the plurality of AC voltage input terminals, and the output of the rectification circuit is electrically connected to the plurality of DC voltage input terminal through the at least one protection device.

In still another alternative embodiment, a method for operating an electronically commutated motor (ECM) utilizing, alternatively, a rectified AC voltage source and a DC voltage source is provided. The method comprises providing a protective device in series with the DC source, configuring the motor with a protective device in series with an input associated with the DC source, providing a common grounding connection between the rectified AC voltage source and the DC voltage source, operating the motor utilizing the rectified AC voltage source when the DC voltage source is providing a voltage below a first threshold, and operating the motor utilizing the DC voltage source when the DC voltage source is providing a voltage above a second threshold. The protective device prevents the rectified AC voltage from being applied to the DC voltage source and the rectifiers utilized in providing the rectified AC voltage source isolate the AC voltage source from the DC voltage source.

DETAILED DESCRIPTION OF THE INVENTION

Described herein are methods and systems for automatically switching the source of operational power for a motor, for example, an electronically commutated motor (ECM), specifically, utilizing solar power, when available, to operate such motors. While ECMs are utilized as examples throughout this disclosure, those of skill in the art will understand that the applications are equally adaptable to applications that utilize other devices that utilize a DC voltage supply, including, but not limited to, variable speed induction motors (VSIMs) and switched reluctance motors (SRMs), which are collectively referred to as direct current (DC) motors.

As is known in the art, ECMs are routinely used to power blowers, fans, and are utilized in a multitude of other applications. However, and as described above, conservation of non-renewable natural resources is a desirable goal. Heretofore, attempting to use alternative sources of power, such as solar power, has had mixed results. In a typical application of solar power, two scenarios are common. In a first, solar panels are utilized to charge batteries, which are then used to provide power to a device. Of course, such an application requires installation of rechargeable batteries which are large in both cost and physical size. In another scenario, the source of power is switched between that provided by a solar panel(s), and that provided by a conventional power source, for example, an electrical service provided by a utility. Problems associated with this scenario typically include elaborate switching circuits that are utilized to switch the power connections to the ECM back and forth between the solar panel voltage source and the conventional voltage source. In addition, since solar panels produce a DC voltage, an inverter circuit has typically been required to invert the DC voltage to an AC voltage, in order to be compatible with known motors.

Figure 1:
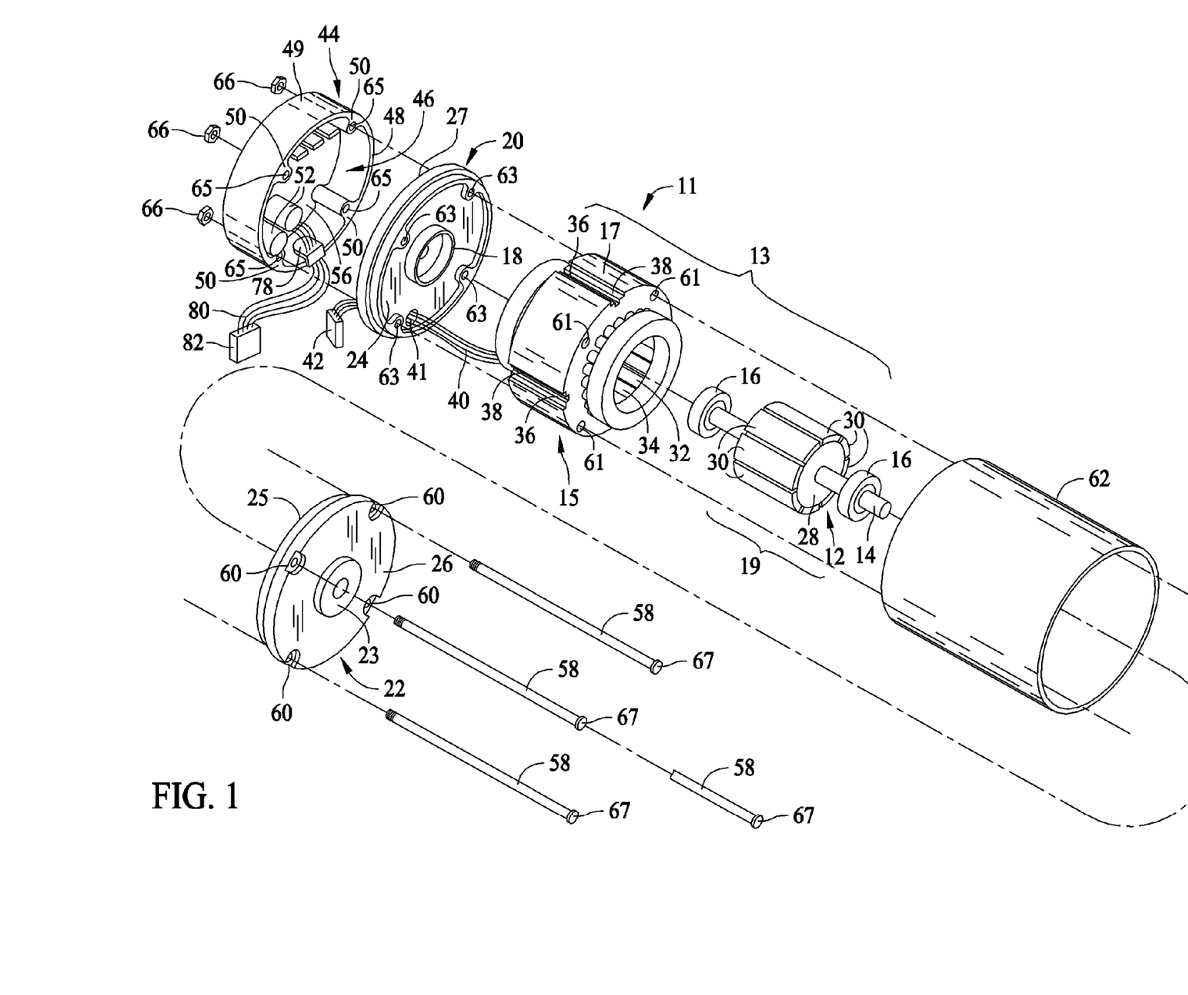
FIG. 1 is an exploded view of an integrated electronically commutated motor (ECM) and control circuit assembly.
Figure 2:
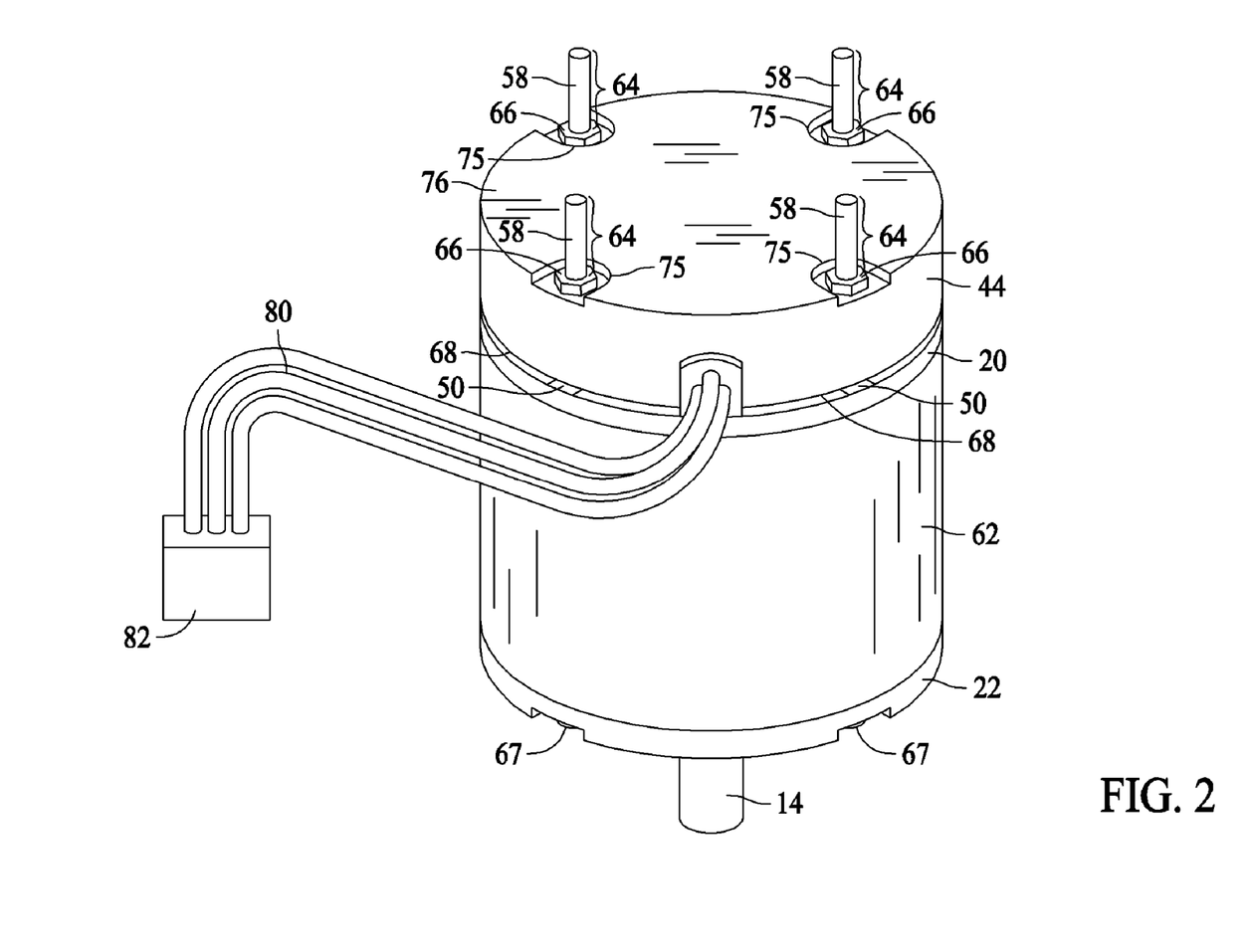
FIG. 2 is a fully assembled view of the ECM and control circuit assembly of FIG. 1.

Referring to the drawings, and more particularly to FIGS. 1 and 2, reference character 11 generally designates an integrated electronically commutated motor and control circuit assembly. Motor assembly 11 comprises a brushless electronically commutated DC motor 13 having a stationary assembly 15 including a stator or core 17 and a rotatable assembly 19 including a permanent magnet rotor 12 and a shaft 14. A fan (not shown) or other means to be driven such as means for moving air through an air handling system engages the shaft 14. Specifically, motor assembly 11 is for use in combination with an air handling system such as an air conditioning system including a fan for blowing air over cooling coils for supplying the cooled air to a building.

Rotor 12 is mounted on and keyed to the shaft 14 journaled for rotation in conventional bearings 16. The bearings 16 are mounted in bearing supports 18 integral with a first end member 20 and a second end member 22. The end members 20 and 22 are substantially flat and parallel to each other. The end members 20 and 22 have inner facing sides 24, 25 between which the stationary assembly 15 and the rotatable assembly 19 are located. Each end member 20 and 22 has an outer side 26, 27 opposite its inner side 24, 25. Additionally, second end member 22 has an aperture 23 for the shaft 14 to pass through and extend out from the outer side 26.

The rotor 12 comprises a ferromagnetic core 28 and is rotatable within the bore of stator 17. Eight essentially identical magnetic material elements or relatively thin arcuate segments 30 of permanent magnet material, each providing a relatively constant flux field, are secured, for example, by adhesive bonding to rotor core 28. The segments 30 are magnetized to be polarized radially in relation to the rotor core 28 with adjacent segments 30 being alternately polarized as indicated. While magnets 30 on rotor 12 are illustrated for purposes of disclosure, it is contemplated that other rotors having different constructions and other magnets different in both number, construction, and flux fields may be utilized with such other rotors within the scope of the invention so as to meet at least some of the objects thereof.

Stationary assembly 15 comprises a plurality of winding stages 32 adapted to be electrically energized to generate an electromagnetic field. Stages 32 are coils of wire wound around teeth 34 of the laminated stator core 17. The core 17 may be held together by four retainer clips 36, one positioned within each notch 38 in the outer surface of the core 17. Alternatively, the core 17 may be held together by other suitable means, such as for instance welding or adhesively bonding, or merely held together by the windings, all as will be understood by those skilled in the art. The winding end turns extend beyond the stator end faces and winding terminal leads 40 are brought out through an aperture 41 in the first end member 20 terminating in a connector 42. While stationary assembly 15 is illustrated for purposes of disclosure, it is contemplated that other stationary assemblies of various other constructions having different shapes and with different number of teeth may be utilized within the scope of the invention so as to meet at least some of the objects thereof.

Motor assembly 11 further includes a cap 44 which is mounted on the rear portion of the motor assembly 11 to enclose within the cap 44 control means 46 for the motor 13. The cap 44 includes an edge 48 having a plurality of spacing elements 50 projecting therefrom which engage the outer side 27 of the first end member 20. Cap 44 includes a substantially annular side wall 49 with the top of the side wall 49 forming edge 48. The control means 46 is positioned adjacent the outer side 27 of the first end member 20. The control means 46 includes a plurality of electronic components 52 and a connector (not shown) mounted on a component board 56, such as a printed circuit board. The control means 46 is connected to the winding stages 32 by interconnecting connector 42 and connector 54. The control means 46 applies a voltage to one or more of the winding stages 32 at a time for commutating the winding stages 32 in a preselected sequence to rotate the rotatable assembly 19 about an axis of rotation.

Connecting elements 58 comprising a plurality of bolts pass through bolt holes 60 in the second end member 22, bolt holes 61 in core 17, bolt holes 63 in first end member 20, and bolt holes 65 in cap 44. The head 67 of the connecting elements 58 engage the second end member 22. The connecting elements 58 are adapted to urge the second end member 22 and the cap 44 toward each other thereby supporting the first end member 20, the stationary assembly 15, and the rotatable assembly 19 therebetween. Additionally, a housing 62 may be positioned between the first end member 20 and the second end member 22 for enclosing and protecting the stationary assembly 15 and the rotatable assembly 10.

Electronically commutated motor 13 as described herein merely for purposes of disclosure is an eight rotor-pole motor, but it will be understood that the electronically commutated motor of this invention may include any even number of rotor poles and the number of stator poles are a multiple of the number of rotor poles, for example, the number of stator poles may be based on the number of phases. In one exemplary embodiment not shown in the Figures, a three-phase ECM includes six rotor pole pairs and 18 stator poles.

The motor assembly 11 according to the invention operates in the following manner. When the winding stages 32 are energized in a temporal sequence three sets of eight magnetic poles are established that will provide a radial magnetic field which moves clockwise or counterclockwise around the core 17 depending on the preselected sequence or order in which the stages are energized. This moving field intersects with the flux field of the magnet 30 poles to cause the rotor to rotate relative to the core 17 in the desired direction to develop a torque which is a direct function of the intensities or strengths of the magnetic fields.

The winding stages 32 are commutated without brushes by sensing the rotational position of the rotatable assembly 19 as it rotates within the core 17 and utilizing electrical signals generated as a function of the rotational position of the rotor 12 sequentially to apply a DC voltage to each of the winding stages 32 in different preselected orders or sequences that determine the direction of the rotation of the rotor 12. Position sensing may be accomplished by a position-detecting circuit responsive to the back electromotive force (EMF) to provide a simulated signal indicative of the rotational position of the rotor 12 to control the timed sequential application of voltage to the winding stages 32 of the motor 13. Other means of position sensing may also be used.

FIG. 2 illustrates the fully assembled motor assembly 11. Connecting elements 58 pass through the second end member 22, the stationary assembly 15, the first end member 20, and the cap 44. The connecting elements 58 have a portion 64 which projects laterally from the cap 44. Portion 64 is adapted to engage a support structure (not shown) for supporting the motor assembly 11. The connecting elements 58 may be secured in place by placing a nut 66 engaging the threads on each of the portions 64 of the connecting elements 58. A wiring harness 80 and connector 82 are utilized to connect motor assembly 11 to an electrical power source and a source of solar energy as further described below.

Spacing elements 50 when engageable with the outer side 27 of the first end member 20 form air gaps 68 between the spacing elements 50, the edge 48, and the outer side 27. The air gaps 68 permit flow through the cap 44 thereby dissipating heat generated by the motor assembly 11. Additionally, if the motor assembly 11 is exposed to rain the air gaps 68 permit rain which has entered the cap 44 to flow out of the cap 44 via the air gaps 68.

Indentations 75 are formed in a bottom 76 of the cap 44 which provide a space for a tool (not shown) to fit in to tighten the nuts 66. The indentations 75 also allow the nuts 66 to be mounted on the connecting elements 58 flush with the bottom 76 of the cap 44.

Figure 3:
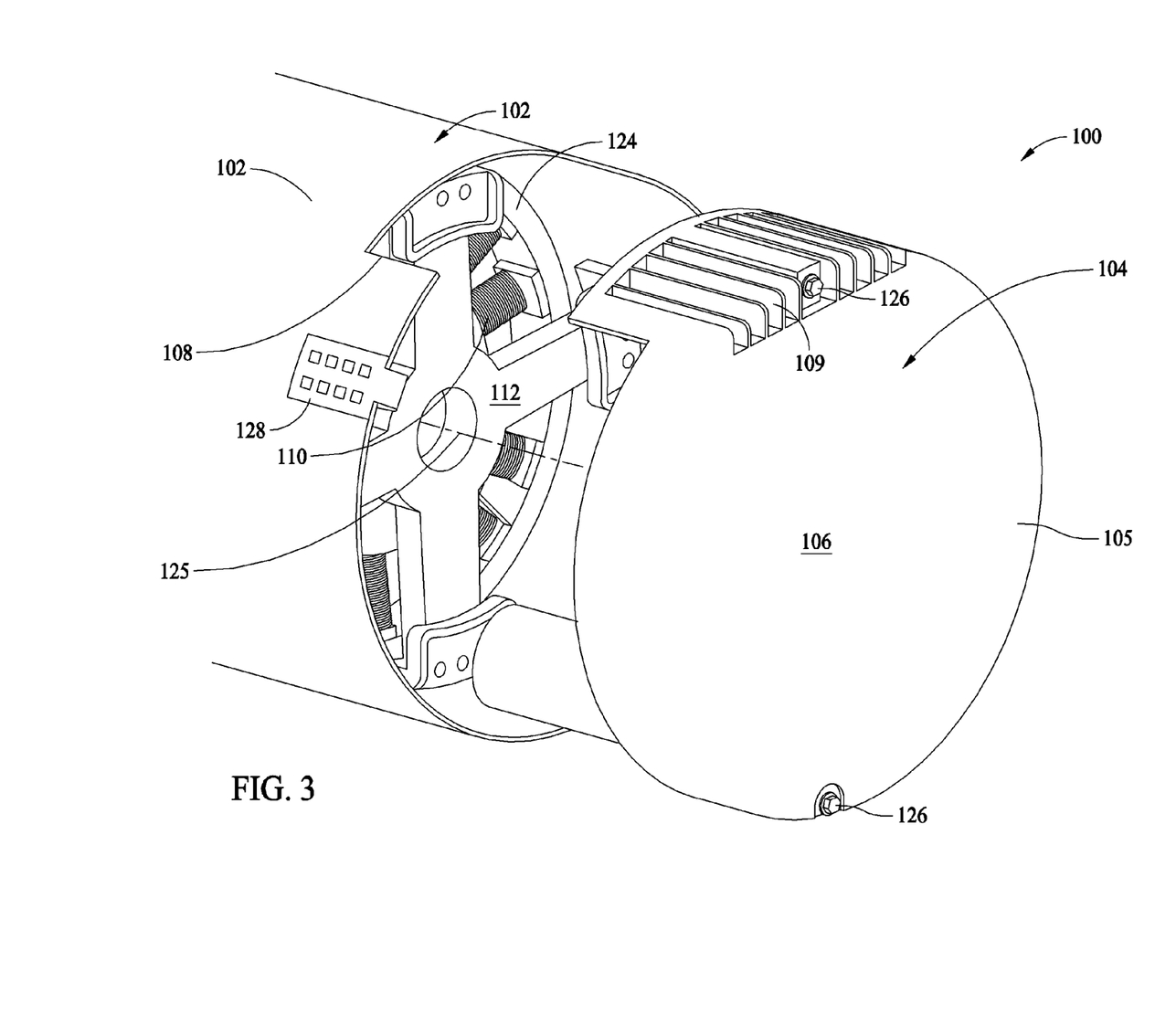
FIG. 3 is an exploded partial view of an ECM having a control circuit that fits into the main chassis of the ECM.

FIG. 3 is an exploded end view of an alternative embodiment for an ECM 100. Motor 100 includes a motor enclosure 102 and a motor control unit 104 configured for attachment to motor enclosure 102. A chassis 105 of motor control unit 104 serves as an end shield 106 for motor 100. Motor enclosure 102 also includes a slot 108 which engages a heat sink 109 formed in chassis 105 as further described below. While motor control unit 104 includes chassis 105, motor 100 is configured such that motor enclosure 102 provides substantially all of the enclosure for motor control unit 104. Within motor enclosure 102 are windings 110 of motor 100 and a mid shield 112 configured for placement between windings 110 and motor control unit 104.

The placement and configuration of mid shield 112 allows motor control unit 104 of motor 100 to be removed and replaced without disruption or displacement of a motor winding assembly 124 which includes windings 110 of motor 100. As illustrated, motor enclosure 102 is configured to form a part of the enclosure for motor control unit 104, along with end shield 106, allowing for a one-piece enclosure configuration. Mid shield 112 is also configured to meet any airflow, voltage clearances and assembly height limitations imposed on motor 100.

In one embodiment, as illustrated, mid shield 112 fits precisely with respect to a centerline 125 of motor 100 and further aligns with two bolts 126 that pass through end shield 106 of motor control unit 104 to clamp and secure mid shield 112 and motor control unit 104 within motor enclosure 102. This alignment and symmetry remain even when chassis 105 containing the electronics of motor control unit 104 is removed. Retaining the alignment and symmetry within enclosure 102 is important as it lowers a replacement cost of motor control unit 104 in the field. Mid shield 112 also contributes to a lower material cost for motor 100, because with mid shield 112, motor enclosure 102 is utilized as a part of the containment enclosure for portions of motor control unit 104 as shown in FIG. 3, decreasing the size of motor 100 as compared to motor 11 (shown in FIGS. 1 and 2). Additionally, such a configuration allows for a placement of a power connector 128 that is flush with chassis 102.

Utilization of mid shield 112 allows motor control unit 104 to be removed from enclosure 102 without disturbing the rest of the motor assembly, for example, windings 110. The non-disturbance is obtained by using mid shield 112 to secure a bearing that engages a motor shaft (neither shown in FIG. 1) of motor 100. Therefore, enclosure 102 is additionally configured to provide any required clearances for the electrical components (e.g., motor control unit 104) of motor 100 to allow disengagement of motor control unit 104 from motor 100.

Figure 4:
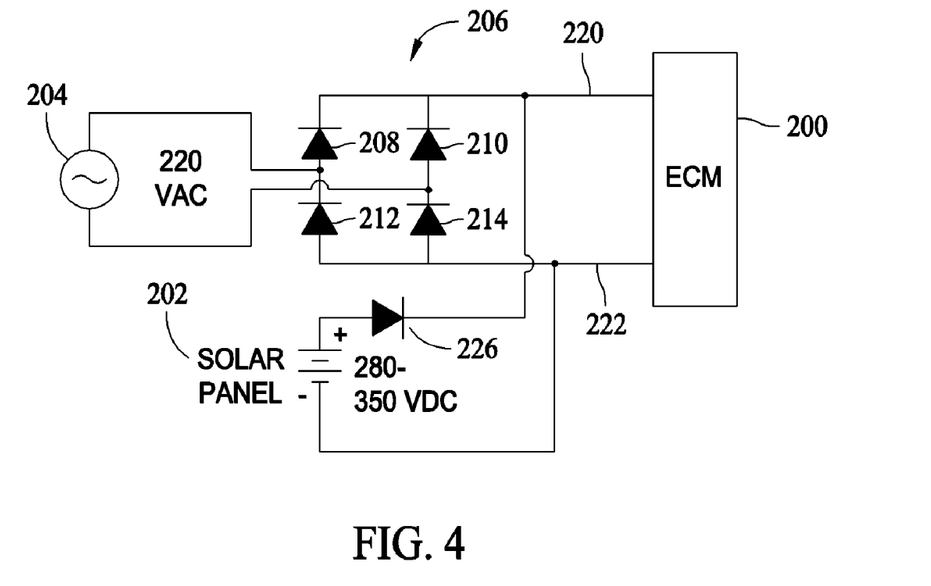
FIG. 4 is a schematic diagram illustrating one embodiment for applying power to an ECM alternatively from a DC voltage source and a conventional AC voltage source.

FIG. 4 is a schematic diagram illustrating one embodiment for applying power to an ECM 200 alternatively from a high voltage DC solar panel 202 and a conventional AC voltage source 204. In the embodiment, ECM 200 is configured to operate utilizing a voltage in the vicinity of 350 volts DC. Though described herein in terms of solar panels, it is to be understood that the described embodiments are applicable utilizing other types of high voltage DC voltages sources. Solar panels, however, provide an additional benefit of utilizing a renewable energy source. In the described embodiment, the solar panels are configured to provide a total voltage in the range from about 280 volts DC to about 350 volts DC.

Referring again to FIG. 4, AC voltage source 204 is rectified utilizing a bridge rectifier 206 consisting of individual rectifiers, typically diodes 208, 210, 212, and 214 as is well known. A rectified AC voltage output, namely nodes 220 and 222 are connected to a power input of ECM 200. In this embodiment, ECM 200 is configured to utilize a DC voltage (e.g., rectified AC voltage) for operation. A isolating device, such as rectifier 226 is in series with DC solar panel 202. This combination is also electrically connected to nodes 220 and 222. As is well known, as the amount of light impinging a solar panel decreases, the voltage output by the solar panel decreases.

As applied to the schematic of FIG. 4, as well as the other embodiments described below, as the voltage output by solar panel 202 increases, to the point of being greater than the rectified AC voltage output by the rectifier 206, the ECM will begin to utilize the power (voltage and current) provided by solar panel 202. As this happens, the AC voltage source 204 and rectifier 206 operate similarly to that of a no load scenario. Additionally, rectifier 206 provides isolation between the solar panel 202 and AC voltage source 204. As the light decreases with respect to solar panel 202, the output voltage begins to drop. Once the solar panel voltage falls below that of the rectified AC voltage, ECM 200 begins to draw its operating power from the source of the rectified AC voltage, specifically, AC voltage source 204. Rectifier 226 provides isolation for solar panel 202 from the voltage and current being output from bridge rectifier 206. In this fashion, ECM 200 can operate using solar power, when available, and continue operation utilizing a conventional power source (AC voltage source 204) when sufficient power is not available form solar panel 202.

Figure 5:
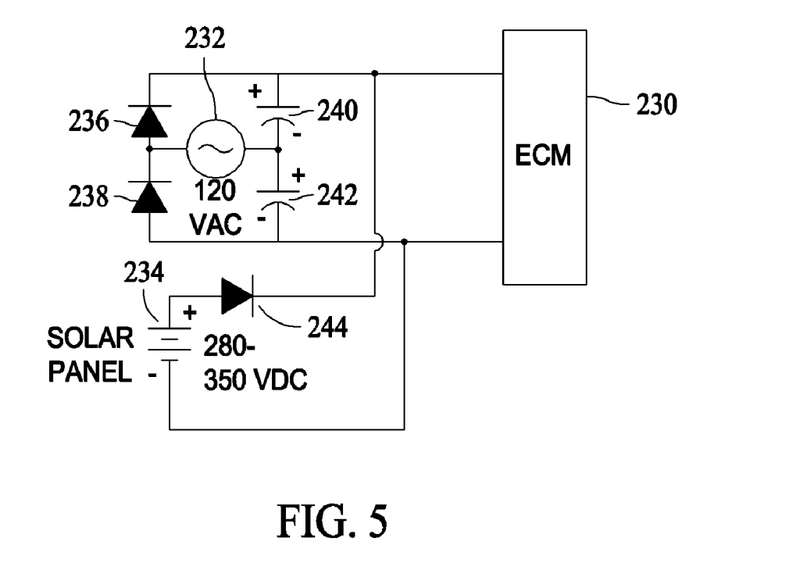
FIG. 5 is a schematic diagram illustrating the ECM power configuration of FIG. 4 utilizing another conventional AC voltage source.

FIG. 5 is an alternative embodiment illustrating operation of a 220 volt ECM 230 utilizing a 120 volt AC source 232. From the standpoint of operating ECM 230 alternatively utilizing a rectified AC voltage and a DC voltage from a solar panel 234, the embodiment of FIG. 4 and FIG. 5 are the same. FIG. 5 illustrates that the rectified AC voltage may be generated from a 120 volt source, and that a full wave rectifier (diodes 236 and 238), rather than a bridge rectifier may be utilized. To provide a rectified AC voltage sufficient for operating ECM 230, a voltage doubler, for example, capacitors 240 and 242, may be utilized. Otherwise, operation of ECM 230 remains the same. ECM 230 can operate using solar power, when available, and continue operation utilizing a conventional power source (AC voltage source 232) when sufficient power is not available form solar panel 234. Similarly to that described above, rectifier 244 provides isolation between the solar panel 234 and AC voltage source 232. Though not illustrated in FIGS. 4 and 5, it is known to produce ECMs that operate using a 120 volt power source. In these cases, solar panels may be fabricated that provide 140-175 volts DC, and a 120 volts AC source may be full-wave or bridge rectified in order to produce alternating sources of power for ECMs similar to the above described embodiments. Such embodiments necessarily include the protective rectifier in series with the solar panel.

Figure 6:
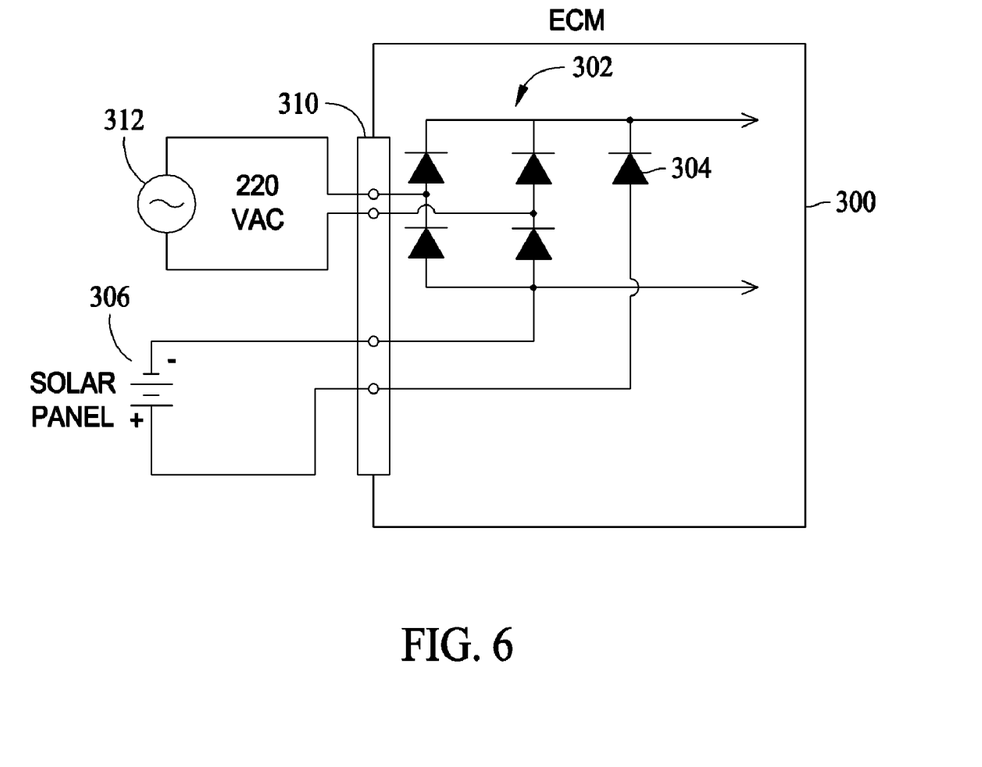
FIG. 6 is a schematic diagram illustrating one embodiment of an ECM, including components within the ECM for alternatively powering the ECM from a DC voltage source and a conventional AC voltage source.

FIG. 6 is an embodiment operationally equivalent to the embodiment illustrated in FIG. 4. FIG. 6 illustrates that an ECM 300 may be configured with a rectification circuit 302 and a protective rectifier 304 (for placing in series with solar panel 306) within its chassis. More specifically, a connector 310 of ECM 300 is configured to include input pins for both an AC voltage (from a conventional AC voltage source 312) and a DC voltage (from, for example, one or more solar panels 306). With respect to one common ECM, the only additional components that would be added to a currently produced model would be the assignment of connector pins for inputting the DC voltage and inclusion of the protective rectifier 304.

Figure 7:
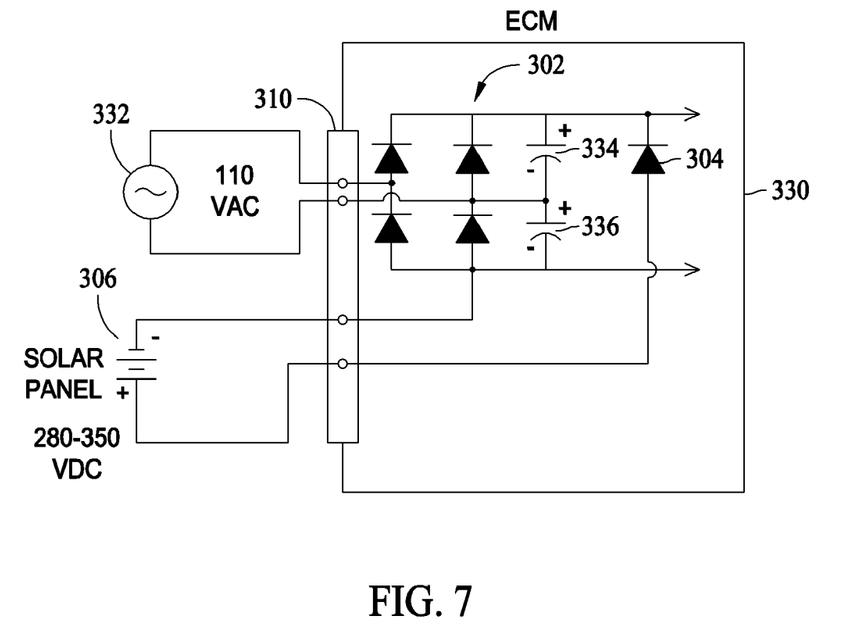
FIG. 7 is a schematic diagram illustrating the ECM power configuration of FIG. 6, including components for utilizing another conventional AC voltage source.

FIG. 7 illustrates an alternative embodiment of ECM 330 to the embodiment illustrated in FIG. 6. ECM 330 is configured to utilize a 110 volt AC voltage source 332. Components that are common with ECM 300 (shown in FIG. 6) are illustrated using the same reference numerals. To provide the 220 volts for operation of ECM 330, the 110 volt AC voltage source 332 is increased using voltage doubler components, namely, capacitors 334 and 336.

Figure 8:
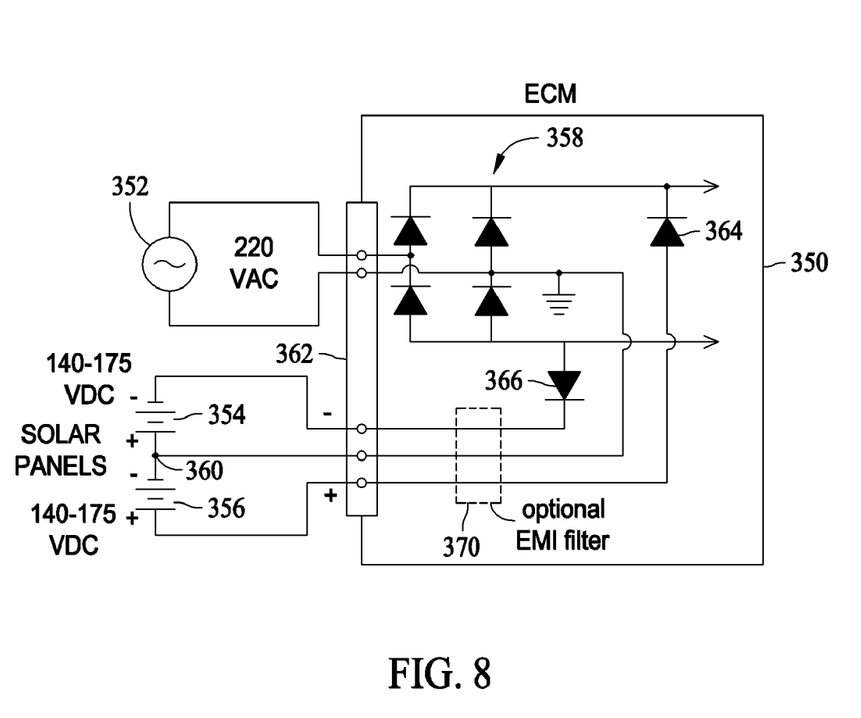
FIG. 8 is a schematic diagram illustrating one embodiment of an ECM, including components within the ECM for alternatively powering the ECM from a DC voltage source and a conventional AC voltage source that are commonly grounded.
Figure 9:
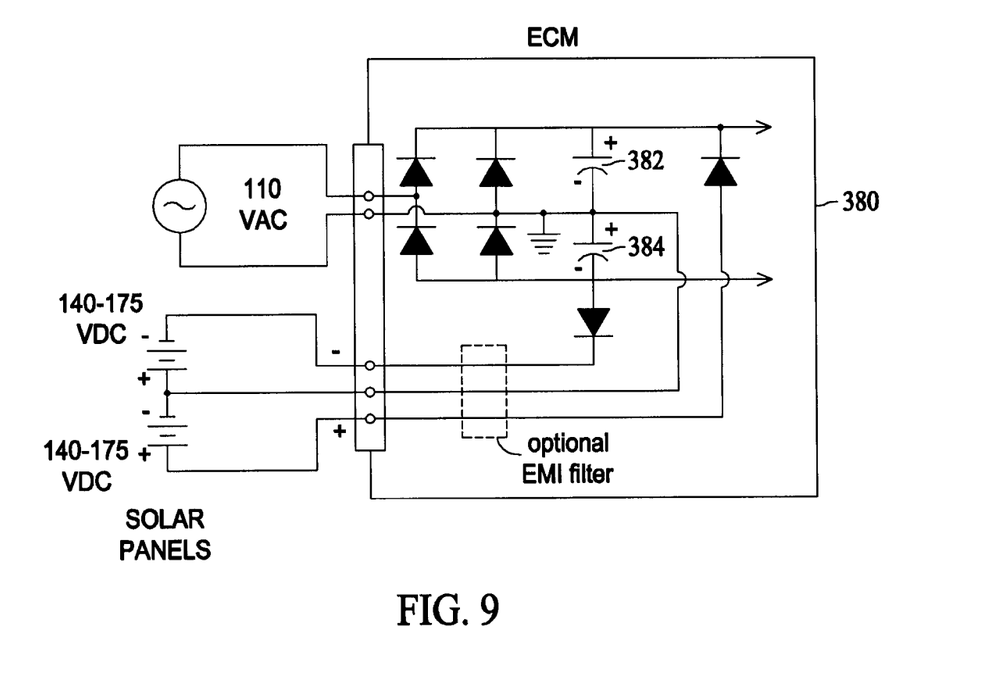
FIG. 9 is a schematic diagram illustrating the ECM power configuration of FIG. 8, including components for utilizing another conventional AC voltage source.

FIG. 8 is a schematic diagram of an ECM power circuit for ECM 350 where a safety ground is provided for both AC voltage source 352 and DC voltage sources 354 and 356. More specifically, one lead of AC voltage source 352 and a portion of bridge rectifier 358 are electrically connected to a chassis (or safety) ground. To provide grounding for a DC voltage source, the previously described solar panels are separated into the two series solar panels 354 and 356. A node 360 that is common between the two DC voltage sources is routed through connector 362 for electrical attachment to the chassis ground. Such a configuration also dictates that DC voltage sources 354 and 356 be protected from rectified AC voltages using separate protective rectifiers 364 and 366. For noise reduction an electromagnetic interference filter 370 may also be electrically coupled to the DC voltage source conductors within ECM 350. FIG. 9 is an illustration of an ECM 380, which further includes voltage doubler capacitors 382 and 384 which allows operation similar to that of ECM 350, though with a 110 volts AC voltage source.

Figure 10:
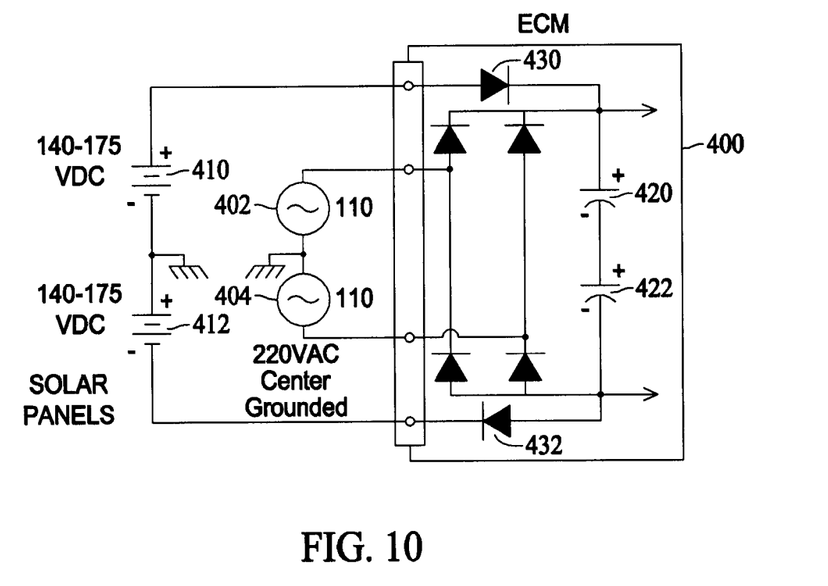
FIG. 10 is a schematic diagram illustrating another configuration for applying separate sources of power to an ECM.

FIG. 10 illustrates another configuration for providing power to an ECM 400. To provide power to ECM 400, two AC voltage sources 402 and 404 of approximately 110 volts AC are connected in series with the node therebetween configured as a chassis (safety) ground. In this configuration AC voltage sources 402 and 404 are capable of together providing 220 volts AC for operation of ECM 400. However, when sufficient light is available, two DC voltage sources 410 and 412, also connected in series, are capable of together providing 280-350 volts DC. The node between DC voltage sources 410 and 412 is also configured as a chassis ground. Internally, with the exception of capacitors 420 and 422, ECM 400 is operationally equivalent to ECM 350 (shown in FIG. 8), including protective rectifiers 430 and 432 that isolate DC voltage sources 410 and 412 from the voltage output by DC voltage sources 410 and 412.

The above described embodiments provide an electronically commutated motor (ECM), which, depending on an amount of ambient light, may or may not be powered by solar panels interconnected to provide a high DC voltage. More specifically, in all the above described embodiments, when a voltage output by solar panels falls below a threshold value, the ECM draws its operating power from a rectified AC voltage source, the solar panels being isolated from the rectified AC voltage source utilizing one or more rectifiers. When the voltage output by the DC voltage sources (e.g., the solar panels) rises above an amount provided by the rectified AC voltage source, the ECM draws it operating power from the DC voltage sources. In this mode of operation, the available rectified AC voltage source operates as if no load is present, which may be indicative of a operating costs savings.

Several embodiments of ECMs are described, including embodiments in which the ECM incorporates one or more of connector pins for inputting a DC voltage, protective rectifiers to isolate the DC voltage source from the rectified AC voltage source, and voltage doublers that allow for ECM utilization with a 100 volts AC voltage sources rather than a more customary 220 volts AC voltage source. Also embodiments that provide safety grounding for both the AC voltage sources and DC voltage sources are provided. As can be appreciated, an ability to seamlessly alternate between a solar power DC voltage source and a conventional AC voltage source for providing power to motors, particularly ECMs, without adding switching circuits or a large number of components can be beneficial, especially when conservation of non-renewable energy sources is desired.

Again, while the example embodiment described herein are described with reference to ECMs, those of ordinary skill in the art will understand that the embodiments may also be utilized with variable speed induction motors (VSIMs) and switched reluctance motors (SRMs).

While the invention has been described in terms of various specific embodiments, those skilled in the art will recognize that the invention can be practiced with modification within the spirit and scope of the claims.

What is claimed is:

1. A method for applying power to a direct current (DC) motor, said method comprising:
   connecting at least one protection device in series with at least one of a plurality of DC voltage input terminals;
   connecting a first conductor of a three conductor alternating current (AC) voltage source to a first input of a rectification circuit, a second conductor of the three conductor AC voltage source to a second input of the rectification circuit, and a center conductor of the three conductor AC voltage source to a chassis ground;
   connecting a DC voltage source to an output of the rectification circuit through the at least one protection device, the DC voltage source capable of providing a voltage equal to or greater than a rectified voltage originating from the AC voltage source, the DC voltage source and at least one protection device in parallel with the output of the rectification circuit, the DC voltage source including a first source and a second source coupled in series and a common node therebetween;
   electrically connecting the DC voltage source and rectification circuit output to operational components of the DC motor, the at least one protection device oriented such that current output from the rectification circuit is not applied to the DC voltage input terminals; and
   electrically connecting the common node of the DC voltage source to the chassis ground.

2. A method according to claim 1 wherein connecting a DC voltage source to an output of the rectification circuit comprises connecting a plurality of series-connected solar panels to the output of the rectification circuit, said plurality of solar panels configured to output a DC voltage equal to or greater than the AC voltage source.

3. A method according to claim 1 wherein configuring the motor with at least one protection device further comprises isolating the DC voltage source from the output of the rectification circuit.

4. A method according to claim 1 wherein configuring the motor with at least one protection device comprises inserting one or more rectifiers in series with the DC voltage source, the one or more rectifiers oriented such that current output from the rectification circuit is not applied to the DC voltage source.

5. A method according to claim 1 further comprising coupling an electromagnetic interference (EMI) suppression device to the DC voltage input terminals.

6. A method according to claim 1 wherein the DC motor is one of an electronically commutated motor, a variable speed induction motor, and a switched reluctance motor.

7. A direct current (DC) motor comprising:
a power connector comprising:
a plurality of input terminals for connection to a three conductor alternating current (AC) voltage source, at least one of said AC voltage source input terminals configured for electrical connection to a ground of the three conductor AC voltage source; and
a plurality of input terminals for connection to a plurality of series connected DC voltage sources, at least one of said plurality of DC voltage source input terminals configured to electrically couple a node common to each of the plurality of DC voltage sources to the ground of the three conductor AC voltage source;
at least one protection device in series with at least one of said plurality of DC voltage source input terminals; and
a rectification circuit comprising an input and an output, said rectification circuit input electrically connected to said plurality of AC voltage input terminals, said rectification circuit output electrically connected to said plurality of DC voltage input terminals through said at least one protection device.

8. A DC motor according to claim 7 wherein said at least one protection device is configured to isolate the plurality of DC voltage sources from said rectification circuit output.

9. A DC motor according to claim 7 wherein said at least one protection device comprises at least one rectifier in series with at least one of said plurality of DC voltage source input terminals, said at least one rectifier oriented such that current output from said rectification circuit is isolated from said plurality of DC voltage source input terminals.

10. A DC motor according to claim 7 further comprising an electromagnetic interference (EMI) suppression device electrically coupled to said DC voltage source input terminals.

11. A DC motor according to claim 7 wherein said at least one protection device comprises:
a first protection device coupled between a first terminal of said plurality of DC voltage source input terminals and a first output terminal of said rectification circuit output; and
a second protection device coupled between a second terminal of said plurality of DC voltage source input terminals and a second output terminal of said rectification circuit output.

12. A method for operating a direct current (DC) motor utilizing alternatively a rectified alternating current (AC) voltage source and a DC voltage source, the DC voltage source comprising a first DC source and a second DC source coupled in series and including a common node, said method comprising:
configuring the motor with a protective device in series with an input associated with the DC voltage source;
providing a common grounding connection between the rectified AC voltage source and the common node between the first DC source and the second DC source;
configuring the motor for operation utilizing the rectified AC voltage source when the DC voltage source is providing a voltage below a first threshold, the protective device preventing the rectified AC voltage from being applied to the DC voltage source; and
configuring the motor for operation utilizing the DC voltage source when the DC voltage source is providing a voltage above a second threshold, the rectifiers utilized in providing the rectified AC voltage source isolate the AC voltage source from the DC voltage source.

13. A method according to claim 12 wherein configuring the motor with a protective device in series with the DC voltage source comprises isolating the DC voltage source utilizing a series rectifier.

14. A method according to claim 12 further comprising rectifying an AC voltage source using a bridge rectifier.

15. A method according to claim 12 further comprising:
rectifying an AC voltage source using a full wave rectifier; and
increasing the rectified AC voltage utilizing capacitors in a voltage doubler configuration.

16. A method according to claim 12 wherein the DC motor is one of an electronically commutated motor, a variable speed induction motor, and a switched reluctance motor.

17. A method according to claim 12 wherein the DC voltage source includes a plurality of solar panels and operating the motor utilizing the DC voltage source when the DC voltage source is providing a voltage above a second threshold comprises operating the motor from the DC voltage source when the voltage output from the solar panels is greater than the rectified AC voltage.

18. A power source for an electric motor, said power source comprising:
an alternating current (AC) voltage source coupled to a rectification circuit, said rectification circuit comprising a first output terminal and a second output terminal coupled to an electric motor and configured to power said electric motor, said AC voltage source further comprising an AC ground connection;
a first direct current (DC) voltage source and a second DC voltage source coupled in series and including a DC ground connection at a node common to said first DC voltage source and said second DC voltage source, said first DC voltage source and said second DC voltage source configured to power said electric motor, said DC ground connection coupled to said AC ground connection;
a first protection device coupled between said first DC voltage source and said first output terminal of said rectification circuit; and
a second protection device coupled between said second DC voltage source and said second output terminal of said rectification circuit.

19. A power source in accordance with claim 18 wherein said first DC voltage source and said second DC voltage source are solar panels configured to provide at least forty-two volts to said electric motor.

20. A power source in accordance with claim 18 further comprising a first voltage doubler capacitor and a second voltage doubler capacitor coupled, respectively, to said first output terminal and said second output terminal.

* * * * *